Patented Apr. 14, 1942

2,279,496

UNITED STATES PATENT OFFICE 2,279,496

STENCIL PASTE

Justus Russell Sackett, Wynnewood, Pa., assignor to E. I. du Pont de Nemours & Company, Wilmington, Del., a corporation of Delaware No Drawing. Application March 22, 1941, Serial No. 384,700

5 Claims. (Cl. 260—40)

This invention relates to coating compositions and more particularly to such coating compositions as are used for making characters, figures, designs and the like and which are applied by forcing suitable pastes through a silk screen stencil by means of a rubber squeegee.

The coating compositions for use as stencil pastes must be of such a consistency as to be free flowing and leave a smooth surface when dried. They must furthermore break cleanly from the design without stringing as the stencil is removed from the surface on which the design has been produced. If the compositions are not free flowing or exhibit properties of incomplete flocculation of the pigment dispersed in the film forming vehicle a finished surface having a pebble-like appearance results rather than a smooth glossy surface. This is obviously undesirable since it detracts from the eye appeal of the finished design.

Although drying oils such as linseed and China-wood oil were formerly used as the film forming vehicle in coating compositions for use as silk screen stencil pastes, these materials have been largely supplanted by drying oils, semi-drying oils, or oil acid modified polyhydric alcohol-polycarboxylic acid resins commonly known as alkyd resins. The use of such vehicles offers advantages with respect to drying time, working properties, finished appearance, and durability which are well known to those skilled in the art of using such compositions.

It has been found that in making the silk screen stencil pastes in certain colors, e. g. light fast red and maroon colors the products exhibit poor flowing properties which is undesirably further manifested in the character of finished design by producing a surface having an uneven or pebble-like appearance as previously noted.

This invention therefore has as a principal object the preparation of silk screen stencil pastes which are free flowing through and under the silk screen.

Another object is the preparation of silk screen stencil pastes with drying or semi-drying fatty oil modified alkyd resins and cadmium sulphide-selenide barium sulphate extended pigments.

A further object is the preparation of silk screen stencil pastes with drying or semi-drying fatty oil modified alkyd resins and cadmium sulphide-selenide barium sulphate extended pigments.

A further object is the preparation of silk screen stencil pastes of a red to maroon color which will produce smooth and glossy characters, figures, designs and the like.

A still further object is the provision of means of treating poor flowing silk screen stencil paste to produce satisfactorily workable products.

Still another object is the preparation of silk screen stencil pastes of a red to maroon color having free flowing properties without imparting other undesirable properties.

These objects are accomplished by the following invention in which a minor proportion of diphenyl guanidine is incorporated in the red stencil paste comprising as essential ingredients fatty oil or oil acid modified alkyd resins and cadmium red pigments.

The cadmium red pigments may be described as cadmium sulfo selenides extended on barium sulphate and are commonly known in the art as cadmium red lithopones. The commonly available ones vary in color from a light red through a maroon shade, the depth of color or shade being dependent largely on the percentage of selenide contained therein.

The invention will be more fully understood by the following examples which are given by way of illustration and not limitation except insofar as defined in the appended claims. The parts are by weight.

EXAMPLE I

Medium red stencil paste

| | Parts |
|---|---|
| Alkyd resin A | 25.0 |
| Alkyd resin B | 26.0 |
| Cobalt drier solution | .1 |
| Inhibitor solution | 1.5 |
| Diphenyl guanidine | .1 |
| China clay extender base | 29.4 |
| Cadmium red lithopone—medium light | 13.8 |
| Cadmium red lithopone—medium | 4.1 |
| | 100.0 |

Alkyd resin A is a 62% linseed oil modified glycerol phthalate and alkyd resin B is a 30% linseed 15% China-wood oil glycerol phthalate 60% solution in hydrocarbon solvent.

The cobalt drier is a solution of cobalt naphthenate in mineral spirits. Other driers as manganese or lead may be used alone or in admixture as varying conditions may indicate.

The inhibitor solution is an approximately 10% solution of thymol in mineral spirits. This material reduces the rapid skinning of the composition and may be replaced by other suitable materials serving the same purpose and well known to those skilled in the art.

The china clay extender base is a preground composition comprising 61% china clay, 23% drying oil modified alkyd resin and 16% liquid hydrocarbon solvent.

The composition is prepared by mixing the ingredients and then passing the mass over a suitable stone mill. The material may then be clarified if desirable by any suitably known means. Other suitable means, well known in the art may be used for preparing the composition and such means will be readily apparent to those practicing the invention.

The diphenyl guanidine may be added, if desired after the other ingredients have been suitably mixed.

This composition is smooth and free flowing and exhibits no evidences of flocculation. When used with a silk screen stencil it produces designs which are smooth and of satisfactory gloss and free of the pebble-like effect previously noted. Designs made with the composition containing no diphenyl guanidine produce a pebble-like effect and poorer gloss which detracts greatly from their appearance.

EXAMPLE II

*Light red stencil paste*

| | Parts |
|---|---|
| Alkyd resin A | 19.6 |
| Alkyd resin B | 20.0 |
| Cobalt drier solution | .2 |
| Inhibitor solution | 1.0 |
| Diphenyl guanidine | .1 |
| Cadmium red lithopone-light | 43.6 |
| China clay extender base | 15.5 |
| | 100.0 |

The various ingredients are as noted under the previous example.

This composition is prepared according to the procedure described under Example I or by any other convenient procedure. The improved results obtained from the use of the composition as a silk screen stencil paste are as previously described.

EXAMPLE III

*Dark red stencil paste*

| | Parts |
|---|---|
| Alkyd resin A | 25.0 |
| Alkyd resin B | 26.0 |
| China clay extender base | 29.3 |
| Cobalt drier solution | .1 |
| Inhibitor solution | 1.6 |
| Diphenyl guanidine | .1 |
| Cadmium red lithopone-deep | 17.9 |
| | 100.0 |

This composition may be prepared as previously described, and when used with silk screen stencils produces the highly desirable results as previously noted.

The present invention is applicable to all compositions containing as the principal pigment constituent any of the varying shades of cadmium red lithopones. Those commonly available are designated as "light" through "maroon shade" with "medium light," "medium" and "deep" intermediate. The use of these pigments is particularly desirable because of their light fastness and other desirable properties which they impart to coating compositions in which they are used.

The examples show the use of 0.1% of diphenyl guanidine based on the total composition. This amount yields satisfactory results although amounts as low as .05% based on the total composition have been found in instances to be effective. Amounts as great as 1.5% are also satisfactorily effective but beyond this amount the point of diminishing returns is reached and the use of greater amounts is not preferred for economic reasons. A preferred range is therefore from .05 to 1.5% of diphenyl guanidine based on the total composition.

The diphenyl guanidine is also effective in producing workable products when added to such compositions which have poor flow and exhibit flocculation of the cadmium red lithopone pigment.

While the alkyd resins noted in the examples are a linseed oil and linseed/China-wood oil modified glycerol phthalate it is to be understood that the invention embraces the use of other drying or semi-drying fatty oil or fatty oil acid modified polyhydric alcohol-polycarboxylic acid resins.

Other fillers may be used either in part or in whole in place of the china clay. Modifications with respect to the use of such ingredients as well as the alkyd resins will be readily apparent to those skilled in the art of preparing and using such compositions.

It will be seen from the above description that means have been provided for preparing oil modified alkyd resin coating compositions applicable for use with silk screen stencils in which the predominating pigment is a cadmium red lithopone. Such products possess as principal advantages over the products of the present state of the art free flowing properties through and under the silk screen; the production of smooth and glossy characters, figures, designs and the like; more satisfactorily workable products and freedom from other undesirable properties as off-shade or color, etc. The products of the present invention constitute a decided advance in the state of the art particularly with reference to products containing cadmium red lithopone pigments.

It is apparent that many widely different embodiments of this invention may be made without departing from the spirit and scope thereof, and therefore, it is not intended to be limited except as indicated in the appended claims.

I claim:

1. A coating composition adapted to be used as a silk screen stencil paste comprising a modified alkyd resin, a cadmium red lithopone pigment and diphenyl guanidine.

2. The composition of claim 1 in which the resin is a drying oil acid modified alkyd resin.

3. The composition of claim 1 in which the resin is a vegetable drying oil modified alkyd resin.

4. The composition of claim 1 in which the diphenyl guanidine is present in amount between .05 and 1.5% of the said composition.

5. A red silk screen stencil paste having substantially the following formula:

| | Parts |
|---|---|
| Oil modified alkyd resin | 51.0 |
| Drier | 0.1 |
| Inhibitor | 1.5 |
| Diphenyl guanidine | 0.1 |
| Extender | 29.4 |
| Cadmium red lithopone | 17.9 |
| | 100.0 |

JUSTUS RUSSELL SACKETT.